(12) United States Patent
McDaniel et al.

(10) Patent No.: US 6,300,271 B1
(45) Date of Patent: *Oct. 9, 2001

(54) COMPOSITIONS THAT CAN PRODUCE POLYMERS

(75) Inventors: Max P. McDaniel; Elizabeth A. Benham; Shirley J. Martin; Kathy S. Collins; James L. Smith, all of Bartlesville; Gil R. Hawley, Dewey; Christopher E. Wittner; Michael D. Jensen, both of Bartlesville, all of OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/080,619

(22) Filed: May 18, 1998

(51) Int. Cl.[7] .................................................. B01J 31/00
(52) U.S. Cl. ..................... 502/104; 502/102; 502/103; 502/113; 502/117; 502/118; 502/119; 502/121; 502/122; 502/123; 502/129; 502/131; 502/132; 502/134
(58) Field of Search .................................. 502/102, 103, 502/104, 113, 117, 118, 119, 129, 131, 132, 134, 122, 123, 121

(56) References Cited

U.S. PATENT DOCUMENTS

| | | | |
|---|---|---|---|
| 4,077,904 | 3/1978 | Noshay et al. | 252/429 R |
| 4,101,445 | 7/1978 | Levine et al. | 252/429 R |
| 4,279,780 | 7/1981 | Dombro | 252/452 |
| 4,476,243 | 10/1984 | Dombro | 502/236 |
| 4,526,942 | 7/1985 | Chester et al. | 526/130 |
| 4,657,998 | 4/1987 | Malpass | 526/144 |
| 4,659,685 | 4/1987 | Coleman, III et al. | 502/113 |
| 4,788,171 | 11/1988 | Klendworth | 502/155 |
| 4,803,253 | 2/1989 | McDaniel et al. | 526/352.2 |
| 4,969,522 | 11/1990 | Whitehurst et al. | 166/278 |
| 5,001,204 | 3/1991 | Klendworth et al. | 526/106 |
| 5,183,868 | 2/1993 | Nordquest | 526/155 |
| 5,321,105 | 6/1994 | Rekers et al. | 526/104 |
| 5,332,707 | 7/1994 | Karayannis et al. | 502/113 |
| 5,401,820 | 3/1995 | McDaniel et al. | 526/348.5 |
| 5,439,995 | 8/1995 | Bailly et al. | 526/125 |
| 5,444,134 | 8/1995 | Matsumoto | 526/159 |
| 5,461,127 | 10/1995 | Naganuma et al. | 526/127 |
| 5,468,702 | 11/1995 | Jejelow | 502/104 |
| 5,496,782 | 3/1996 | Zandona | 502/113 |
| 5,527,867 | 6/1996 | Bergmeister | 526/119 |
| 5,556,893 | 9/1996 | Costa et al. | 521/143 |
| 5,612,271 | 3/1997 | Zandona | 502/117 |
| 5,643,847 | 7/1997 | Walzer | 502/117 |
| 5,648,439 | 7/1997 | Bergmeister et al. | 526/96 |
| 5,670,580 | 9/1997 | Tazaki et al. | 525/240 |
| 5,854,165 * | 12/1998 | Yabunouchi et al. | 502/117 |
| 5,861,352 * | 1/1999 | Gila et al. | 502/155 |

FOREIGN PATENT DOCUMENTS 628 574 A1    12/1994    (EP).

OTHER PUBLICATIONS

"Activation of $SiO_2$–supported zirconocene catalysts by common trialkylaluminums", 1297 Die Makromol. Chem., 194 (1993) Dec., No. 12, Basel, CH, no month available.

"A Crystallizable Organometallic Complex Containing Titanium and Aluminum" Journal of the American Chemical Society, vol. 79, No. 11, pp. 2975–2976 (1957). No month available.

"Bis–(Cyclopentadienyl)–Titanium Dichloride–Alkylaluminum Complexes as Catalysts for the Polymerization of Ethylene" Journal of the American Chemical Society, vol. 79, No. 18, pp. 5072–5073 (1957). No month available.

"Olefin Copolymerization with Metallocene Catalysts. III Supported Metallocene/Methylaluminoxane Catalyst for Olefin Copolymerization" Journal of Polymer Science, Part A, Polymer Chemistry, vol. 29, p 1603 (1991). No month available.

"Polymerization of Propene with Catalyst Systems Composed of $AL_2O_3$–OR $MGCL_2$–Supported $ET[INDH_4]_2$ $ZRCL_2$ and $ALR_3(R=CH_3,C_2H_5)$" Makromol. Chem., Rapid Commun. 12, 367–372 (1991). No month available.

Surface–Bound Metal Hydrocarbyls. Organometallic Connections Between Accounts of Chemical Research, vol. 25, No. 2, p. 57 (1992). No month available.

Polymerization of Propylene Using Supported, Chiral, Ansa–Metallocene Macromolecules, vol. 25, pp. 1780–1785 (1992). No month available.

Polymerization of Propene with the Heterogeneous Catalyst System Makromol. Chem., Rapid Commun. 13, 221–224 (1992). No month available.

"High Melting Polypropylenes by Silica–Supported Zirconocene Catalysts" Makromol. Chem., Rapid Commun. 14, 239–243 (1993). No month available.

Polymerization of Propene with Zirconocene–Containing Supported Catalysts Makromol. Chem. 194, 1745–1755 (1993). No month available.

Highly Isospecific $SIO_2$–Supported Zirconocene Catalyst Activated by Ordinary Makromol. Chem., Rapid Commun. 15, 139–143 (1994). No month available.

Silica–Supported Metallocenes: Stereochemical Comparison Between Homogeneous Makromol. Chem., Rapid Commun. 16, 581–590 (1995). No month available.

"Metallocenes for Polymer Catalysis" Advances in Polymer Science, vol. 127, p. 143 (1997). No month available.

* cited by examiner

*Primary Examiner*—Elizabeth D. Wood
(74) *Attorney, Agent, or Firm*—Polly C. Owen

(57) ABSTRACT

This invention provides a compositions that are useful for polymerizing at least one monomer into at least one polymer.

39 Claims, No Drawings

COMPOSITIONS THAT CAN PRODUCE POLYMERS

FIELD OF THE INVENTION

This invention is related to the field of compositions that can be used to polymerize monomers into at least one polymer.

BACKGROUND OF THE INVENTION

The production of polymers is a multi-billion dollar business. This business produces billions of pounds of polymers each year. Millions of dollars have been spent on developing technologies that can add value to this business.

One of these technologies is called metallocene catalyst technology. Metallocene catalysts have been known since about 1960, however, their low productivity did not allow them to be commercialized. About 1975, it was discovered that contacting one part water with two parts trimethylaluminum to form methyl aluminoxane, and then contacting such methyl aluminoxane with a metallocene compound, formed a metallocene catalyst that had greater activity. However, it was soon realized that large amounts of expensive methyl aluminoxane were needed to form an active metallocene catalyst. This has been a significant impediment to the commercialization of metallocene catalysts.

Borate compounds have been use in place of large amounts of methyl aluminoxane. However, this is not satisfactory, since borate compounds are very sensitive to poisons and decomposition, and can also be very expensive.

It should also be noted that having a heterogeneous catalyst is important. This is because heterogeneous catalysts are required for most modern commercial polymerization processes. Furthermore, heterogeneous catalysts can lead to the formation of substantially uniform polymer particles that have a high bulk density. These types of substantially uniformed particles are desirable because they improve the efficiency of polymer production and transportation. Efforts have been made to produce heterogeneous metallocene catalysts, however, these catalysts have not been entirely satisfactory.

Therefore, the inventors provide this invention to solve these problems.

SUMMARY OF THE INVENTION

An object of this invention is to provide a process that produces a composition that can be used to polymerize monomers into at least one polymer.

Another object of this invention is to provide said composition.

Another object of this invention is to provide a process to polymerize monomers into at least one polymer using said composition.

Another object of this invention is to provide a manufacture that comprises at least one said polymer.

Another object of this invention is to provide a machine that comprises at least one said manufacture.

In accordance with one embodiment of this invention, a process to produce a composition of matter is provided. Said process comprises (or optionally, consists essentially of, or consists of) contacting an organometal compound, a treated solid oxide compound, and an organoaluminum compound to produce said composition, wherein said composition consists essentially of (or optionally, consists of) a post-contacted organometal compound, a post-contacted treated solid oxide compound, and optionally, a post-contacted organoaluminum compound.

In accordance with another embodiment of this invention, a composition of matter is provided. Said composition consists essentially of a post-contacted organometal compound, a post-contacted treated solid oxide compound, and optionally, a post-contacted organoaluminum compound.

In accordance with another embodiment of this invention, a process to polymerize monomers into at least one polymer using said composition is provided. Said process comprises contacting said composition with monomers.

In accordance with another embodiment of this invention a manufacture is provided. Said manufacture comprises at least one said polymer.

In accordance with another embodiment of this invention a machine is provided. Said machine comprises at least two said manufactures.

These objects, and other objects, will become more apparent to those with ordinary skill in the art after reading this disclosure.

It should be noted that the phrase "consisting essentially of" means that the only other items (such as, for example, process steps, and other compounds) included within the scope of the claims are those items that do not materially affect the basic and novel characteristics of the claimed invention.

It should also be noted that the phrase "consisting of" means that the no other items (such as, for example, process steps, and other compounds) are included within the scope of the claims, except items that are impurities ordinarily associated with a composition, or items that are process steps ordinarily associated with a process.

DETAILED DESCRIPTION OF THE INVENTION

Organometal compounds used in this invention have the following general formula.

Formula One: $(X^1)(X^2)(X^3)(X^4)M^1$

In this formula, $M^1$ is selected from the group consisting of titanium, zirconium, and hafnium. Currently, it is most preferred when $M^1$ is zirconium.

In this formula ($X^1$) is independently selected from the group consisting of (hereafter "Group OMC-I") cyclopentadienyls, indenyls, fluorenyls, substituted cyclopentadienyls, substituted indenyls, such as, for example, tetrahydroindenyls, and substituted fluorenyls, such as, for example, octahydrofluorenyls.

The substituents on the substituted cyclopentadienyls, substituted indenyls, and substituted fluorenyls, can be aliphatic groups, cyclic groups, combinations of aliphatic and cyclic groups, and organometallic groups, as long as these groups do not substantially, and adversely, affect the polymerization activity of the composition. Additionally, hydrogen can be a substituent.

Suitable examples of aliphatic groups are hydrocarbyls, such as, for example, paraffins and olefins. Suitable examples of cyclic groups are cycloparaffins, cycloolefins, cycloacetylenes, and arenes. Additionally, alkylsilyl groups where each alkyl contains 1–12 carbon atoms, alkyl halide groups where each alkyl contains 1–12 carbon atoms, or halides, can also be used.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, and iodo.

In this formula ($X^3$) and ($X^4$) are independently selected from the group consisting of (hereafter "Group OMC-II") halides, aliphatic groups, cyclic groups, combinations of aliphatic and cyclic groups, and organometallic groups, as long as these groups do not substantially, and adversely, affect the polymerization activity of the composition.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when ($X^3$) and ($X^4$) are selected from the group consisting of halides and hydrocarbyls, where such hydrocarbyls have from 1 to 10 carbon atoms. However, it is most preferred when ($X^3$) and ($X^4$) are selected from the group consisting of fluoro, chloro, and methyl.

In this formula, ($X^2$) can be selected from either Group OMC-I or Group OMC-II.

When ($X^2$) is selected from Group OMC-I, it should be noted that ($X^1$) and ($X^2$) can be joined with a bridging group, such as, for example, aliphatic bridging groups, cyclic bridging groups, combinations of aliphatic and cyclic bridging groups, and organometallic bridging groups, as long as the bridging group does not substantially, and adversely, affect the polymerization activity of the composition.

Suitable examples of aliphatic bridging groups are hydrocarbyls, such as, for example, paraffins and olefins. Suitable examples of cyclic bridging groups are cycloparaffins, cycloolefins, cycloacetylenes, and arenes. Additionally, it should be noted that silicon and germanium are also good bridging units.

Various processes are known to make these compositions. See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference.

Specific examples of such compositions are as follows:
bis(cyclopentadienyl)hafnium dichloride;
bis(cyclopentadienyl)zirconium dichloride;
[ethyl(indenyl)$_2$]hafnium dichloride;
[ethyl(indenyl)$_2$]zirconium dichloride;
[ethyl(tetrahydroindenyl)$_2$]hafnium dichloride;
[ethyl(tetrahydroindenyl)$_2$]zirconium dichloride;
bis(n-butylcyclopentadienyl)hafnium dichloride;
bis(n-butylcyclopentadienyl)zirconium dichloride;
((dimethyl)(diindenyl)silane)zirconium dichloride;
((dimethyl)(diindenyl)silane)hafnium dichloride:
((dimethyl)(ditetrahydroindenyl)silane)zirconium dichloride;
((dimethyl)(di(2-methyl indenyl))silane)zirconium dichloride; and
bis(fluorenyl)zirconium dichloride.

Organoaluminum compounds have the following general formula.

Formula Two: $Al(X^5)_n(X^6)_{3-n}$

In this formula ($X^5$) is a hydrocarbyl having from 1–20 carbon atoms. Currently, it is preferred when ($X^5$) is an alkyl having from 1 to 10 carbon atoms. However, it is most preferred when ($X^5$) is selected from the group consisting of methyl, ethyl, propyl, butyl, and isobutyl.

In this formula ($X^6$) is a halide, hydride, or alkoxide. Currently, it is preferred when ($X^6$) is independently selected from the group consisting of fluoro and chloro. However, it is most preferred when ($X^6$) is chloro.

In this formula "n" is a number from 1 to 3 inclusive. However, it is preferred when "n" is 3.

Examples of such compounds are as follows:
trimethylaluminum;
triethylaluminum;
tripropylaluminum;
diethylaluminum ethoxide;
tributylaluminum;
triisobutylaluminum hydride;
triisobutylaluminum; and
diethylaluminum chloride.

Currently, triethylaluminum is preferred.

The treated solid oxide compounds are compounds that have had their Lewis acidity increased. It is preferred when said treated solid oxide compound comprises oxygen and at least one element selected from the group consisting of groups 2, 3, 4, 5, 6, 7, 8, 9, 10, 11, 12, 13, 14, and 15 of the periodic table, including lanthanides and actinides (See Hawley's Condense Chemical Dictionary, 11th Edition). However, it is preferred when the element is selected from the group consisting of Al, B, Be, Bi, Cd, Co, Cr, Cu, Fe, Ga, La, Mn, Mo, Ni, Sb, Si, Sn, Sr, Th, Ti, V, W, P, Y, Zn and Zr. It is important that these treated solid oxide compounds have electron withdrawing ability, while not wanting to be bound by theory, it is believed that a treated solid oxide compound should have a higher Lewis acidity compared to the untreated solid oxide compound. However, it is hard to accurately measure the Lewis acidity of these treated, and untreated solid oxide compounds so other methods have been used. Currently, comparing the activities of treated, and untreated solid oxide compounds under acid catalyzed reactions is preferred.

Treated solid oxide compounds can be produced in a variety of ways, such as, for example, by gelling, co-gelling, or impregnation of one compound onto another, followed by calcination.

In general, it is preferred to contact at least one solid oxide compound, such as, for example, alumina, zirconia, titania, and mixtures thereof or with mixture with other solid oxides such as, for example, silica alumina, with at least one electron-withdrawing anion source compound, to form a first mixture, followed by calcining this first mixture to form a treated solid oxide compound. In the alternative, a solid oxide compound and an electron-withdrawing anion source compound can be contacted and calcined simultaneously. The electron-withdrawing anion source compound is any compound that increases the Lewis acidity of the solid oxide under the conditions given herein for producing the treated solid oxide compound. These electron-withdrawing anion source compounds increase the Lewis acidity of the solid oxide by contributing to the formation of an electron withdrawing anion, such as, for example, sulfates, halides, and triflate. It should be noted that one or more different electron withdrawing anions can be used.

The acidity of the solid oxide compound can be further enhanced by using two, or more, electron-withdrawing anion source compounds in two, or more, separate contacting steps. An example of such a process is contacting at least one solid oxide compound with a first electron-withdrawing anion source compound to form a first mixture, followed by calcining this first mixture, followed by contacting with a second electron-withdrawing anion source compound to form a second mixture, followed by calcining said second mixture to form a treated solid oxide compound. It should be noted that the first and second electron-withdrawing anion source compounds can be the same, but are preferably different.

Suitable examples of solid oxide compounds include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$: and mixtures thereof, such as, for example, silica-alumina and silica-zirconia. It should be noted that solid oxide compounds that comprise Al—O bonds are currently preferred.

It is important that the solid oxide compound is also calcined. This calcining can be conducted in an ambient atmosphere, preferably a dry ambient atmosphere, at a temperature in the range of about 200° C. to about 900° C., and for a time in the range of about 1 minute to about 100 hours. Currently, temperatures from about 400° C. to about 800° C. and a time in the range of about 1 hour to about 10 hours, are preferred.

Treated solid oxide compounds, should have pore volumes greater than about 0.01 cc/g, preferably greater than about 0.1 cc/g, and most preferably, greater than about 1 cc/g.

Treated solid oxide compounds should have surface areas greater that about 1 $m^2$/g, preferably greater than 100 $m^2$/g, and most preferably greater than 200 $m^2$/g.

The compositions of this invention can be produced by contacting an organometal compound, an treated solid oxide compound, and an organoaluminum compound, together. This contacting can occur in a variety of ways, such as, for example, blending. Furthermore, each of these compounds can be fed into the reactor separately, or various combinations of these compounds can be contacted together before being further contacted in the reactor, or all three compounds can be contacted together before being introduced into the reactor. Currently, one method is to first contact the organometal compound and the treated solid oxide compound together, for about 1 minute to about 24 hours, preferably, about 1 minute to about 1 hour, at a temperature from about 10° C. to about 200° C., preferably about 25° C. to about 100° C., to form a first mixture, and then contact this first mixture with an organoaluminum compound to form the composition. During contacting, or after contacting, the mixtures or the composition can be calcined. This calcining can be conducted in an ambient atmosphere, preferably a dry ambient atmosphere, at a temperature in the range of about 300° C. to about 900° C., and for a time in the range of about 1 minute to about 100 hours. Currently, temperatures from about 500° C. to about 700° C. and a time in the range of about 1 hour to about 10 hours, are preferred. Currently, it is preferred to use dry nitrogen as the ambient atmosphere.

After contacting, the composition consists essentially of, (or consists of) a post-contacted organometal compound, a post-contacted treated solid oxide compound, and optionally, a post-contacted organoaluminum compound. It should be noted that the post-contacted treated solid oxide compound is the majority, by weight, of the composition. Since the exact order of contacting is not known, it is believed that this terminology best describes the composition's components.

The composition of this invention has an activity greater than a composition that uses the same organometal compound, and the same organoaluminum compound, but uses untreated Ketjen grade B alumina (see comparative examples 4, 5, and 6) instead of the treated solid oxide compounds of this invention. This activity is measured under slurry polymerization conditions, using isobutane as the diluent, and with a polymerization temperature of 50–150° C., and an ethylene pressure of 400–800 psig. The reactor should have substantially no indication of any wall scale, coating or other forms of fouling.

However, it is preferred if the activity is greater than 100 grams polyethylene per gram of treated solid oxide compound per hour (hereafter "gP/(gS·hr)"), more preferably greater than 250, even more preferably greater than 500, even more preferably greater than 1000, and most preferably greater than 2000. This activity is measured under slurry polymerization conditions, using isobutane as the diluent, and with a polymerization temperature of 90° C., and an ethylene pressure of 550 psig. The reactor should have substantially no indication of any wall scale, coating or other forms of fouling.

These compositions are often sensitive to hydrogen and sometimes incorporate comonomers well, and usually produce polymers with a low HLMI/MI ratio.

One of the important aspects of this invention is that no aluminoxane needs to be used in order to form the composition. This also means that no water is needed to help form such aluminoxanes. This is beneficial because water can sometimes kill a polymerization process. Additionally, it should be noted that no borate compounds need to be used in order to form the composition. In summary, this means that the composition, which is heterogenous, and which can be used for polymerizing monomers, can be easily and inexpensively produced because of the substantial absence of any aluminoxane compounds or borate compounds. Additionally, no organochromium needs to be added, nor any $MgCl_2$ needs to be added to form the invention.

The monomers useful in this invention, are unsaturated hydrocarbons having from 2 to 20 carbon atoms. Currently, it is preferred when the monomer is selected from the group consisting of ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof. However, when a homopolymer is desired, it is most preferred to use ethylene, or propylene, as the monomer. Additionally, when a copolymer is desired, it is most preferred to use ethylene and hexene as the monomers.

Processes that can polymerize monomers into polymers are known in the art, such as, for example, slurry polymerization, gas phase polymerization, and solution polymerization. It is preferred to perform a slurry polymerization in a loop reactor. Furthermore, it is even more preferred to use isobutane as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

It should be noted that under slurry polymerization conditions these compositions polymerize ethylene alone, or ethylene with a 1-olefin, or propylene very well. In particular, the compositions used in this process produce good quality polymer particles without substantially fouling the reactor. When the composition is to be used in a loop reactor under slurry polymerization conditions, it is preferred when the particle size of the solid mixed oxide compound is in the range of about 10 to about 1000 microns, preferably 25 to 500 microns, and most preferably, about 50 to about 200 microns, for best control during polymerization.

After the polymers are produced, they can be formed into various manufactures, such as, for example, household containers and utensils, drums, fuel tanks, pipes, geomembranes, and liners. Various processes can form these manufactures. Usually, additives and modifiers are added to the polymer in order to provide desired effects. It is believed that by using the invention described herein, manufactures can be produced at a lower cost, while maintaining most, if not all, of the unique properties of polymers produced with metallocene catalysts.

Additionally, these manufactures can be part of a machine, such as, for example, a car, so that the weight of the car will be less, with the attended benefits thereof.

EXAMPLES

These examples provide additional information to a person skilled in the art. These examples are not meant to be construed as limiting the scope of the claims.

DESCRIPTION OF THE POLYMERIZATIONS RUNS

All polymerization runs were conducted in a steel reactor that had a volume of 2.2 liters. This reactor was equipped with a marine stirrer. During the polymerizations this stirrer was set to run at 400 rpm. This reactor was also surrounded by a steel jacket that was connected to a steel condenser. The steel jacket contained methanol that was boiling. The boiling point of the methanol was controlled by varying the nitrogen pressure that was applied to the steel condenser and the steel jacket. This control method permitted precise temperature control (+0.5° C.).

First, a treated, or untreated, solid oxide compound was charged, under nitrogen, to the reactor, which was dry. Second, organometal compound solution was added to the reactor by syringe. Third, 0.6 liters of isobutane was charged to the reactor. Fourth, organoaluminum compound was added midway during the isobutane addition. Fifth, 0.6 liters of isobutane was charged to the reactor. Sixth, ethylene was added to the reactor to equal 550 psig pressure. Seventh, the reactor was heated to 90° C. This pressure was maintained during the polymerization. During polymerization, stirring continued for the specified time. Activity was determined by recording the flow of ethylene into the reactor to maintain pressure. Eighth, after the specified time, the ethylene flow was stopped and the reactor slowly depressurized. Eighth, the reactor was opened to recover a granular polymer powder.

In all inventive runs, the reactor was clean with no indication of any wall scale, coating or other forms of fouling. The polymer powder was removed and weighed. Activity was specified as grams of polymer produced per gram of treated, or untreated, solid oxide compound charged per hour.

In some cases the treated solid oxide compound and the organometal compound were first pre-contacted, in the reactor, for about half an hour at 90° C. in one liter of isobutane before the organoaluminum compound and ethylene were added to the reactor.

Preparation of Solid Oxides

Silica, grade 952, having a pore volume of 1.6 cc/g and a surface area of about 300 square meters per gram was obtained from W.R.Grace. About 10 grams of this material was placed in a 1.75 inch quartz tube, which was fitted at the bottom with a sintered quartz. While the silica was supported on the disk, dry air was blown up through the disk at the linear rate of about 1.6 to 1.8 standard cubic feet per hour. An electric furnace around the quartz tube was then turned on and the temperature was raised at the rate of 400° C. per hour to a temperature of 600° C. At that temperature, the silica was allowed to fluidize for three hours in the dry air. Afterward, the silica was collected and stored under dry nitrogen.

Some alumina samples were also prepared by the procedure described in the silica preparation. A commercial alumina sold by AKZO Company as Ketjen grade B alumina was obtained, having a pore volume of about 1.78 cc/g and a surface area of around 340 square meters per gram. The temperatures used in the preparation of these aluminas were 400° C., 600° C., and 800° C.

A silica-alumina was also obtained from W.R.Grace (MS 13-110 containing 13% alumina and 87% silica). This silica-alumina had a pore volume of 1.2 cc/g and a surface area of about 300 square meters per gram. This silica-alumina was prepared as described in the silica preparation. The temperature used in the preparation of this silica-alumina was 600° C.

A silica-titania was obtained by co-gellation as described in U.S. Pat. No. 3,887,494 ("Deitz"). Titanyl sulfate was dissolved in concentrated sulfuric acid, to form a first mixture. Afterwards, a sodium silicate solution was slowly added, with vigorous stirring, to this first mixture, to form a second mixture. When the pH of the second mixture reached about 6, this second mixture gelled into a homogenous, substantially-clear first product. This first product was then aged, at 80° C. and a pH 7, for three hours, followed by washing it nine times with water, and two times in 1% ammonium nitrate, to form a second product. This second product, which was a gel, was then azeotropically dried in ethyl acetate, to form a third product. This third product contained 8% titanium. It also had a surface area of 450 square meters per gram and a pore volume of 2.0 cc/g. This silica-titania was then prepared as described in the silica preparation. The temperature use in the preparation of this silica-titania was 600° C.

An alumino-phosphate was prepared according to U.S. Pat. No. 4,364,855 (McDaniel). Aluminum nitrate (380 grams) and mono-ammonium phosphate (94 grams) was dissolved in deionized water to form a first mixture. About 170 milliliters of ammonium hydroxide was then added to this first mixture to form a second mixture. At a pH of about 8 this second mixture gelled to form a first product. This first product was then washed twice in water, and once in n-propanol, before drying overnight at 80° C. under a vacuum, to form a second product. This second product contained a phosphorus to aluminum molar ratio of 0.8, a pore volume of 2.1 cc/g, and a surface area of 250 square meters per gram. This alumino-phosphate was then prepared as described in the silica preparation. The temperature use in the preparation of this alumina-phosphate was 600° C.

Comparative Examples 1–2

These examples demonstrate that an organometal compound contacted with an organoaluminum compound, provides little, if any, polymerization activity.

A polymerization run was made as described earlier. First, an organometal compound was added to the reactor (2 ml of bis(n-butylcyclopentadienyl)zirconium dichloride solution containing 0.5 grams per 100 ml of toluene). Second, half of the isobutane was then added to the reactor. Third, 2 ml of 15 weight percent triethyl aluminum for example 1, or 2 ml of 25 weight percent ethyl aluminum dichloride (EADC) for example 2, were added to the reactor. Fourth, the other half of the isobutane was added to the reactor.

Ethylene was then added to the reactor but no polymerization activity was observed. After one hour of contacting, the reactor was depressurized and opened.

In each case, no polymer was found. These results are shown in Table-I.

Comparative Examples 3–9

These examples demonstrate that contacting a solid oxide compound, with an organometal compound, and with an organoaluminum compound, provided little, if any, polymerization activity.

Each of the solid oxide compounds described earlier was added to the reactor, followed by an organometal compound (2 ml of bis(n-butylcyclopentadienyl)zirconium dichloride solution (0.5 grams per 100 ml of toluene), and then the organoaluminum compound (triethylaluminum). These examples are shown in Table-I.

The first two examples show that contacting an organometal compound with an organoaluminum compound provides little, if any, polymerization activity. The silica example produced almost no polymer. Alumina, which is regarded as more acidic than silica, produced more polymer, but still the activity was very low. The alumino-phosphate, silica-alumina, and silica-titania supports exhibited only marginal activity. Activity is expressed in Table-I as gP/(gS·hr).

Comparative Example 10

A solution was made of 244 grams of ammonium sulfate dissolved in water to equal 437 mls total. Then 100 mls of this solution was impregnated onto 33.2 grams of W.R. Grace grade 952 silica. The wet mixture was dried in a vacuum oven at 110° C. for 12 hours. This is equivalent to 12.7 mmol of sulfate per gram of silica. The dried material was ground through a 35 mesh screen, then calcined in air at 400° C. according to the procedure described earlier. It was found to have a pore volume of 1.22 cc/g and a surface area of 223 square meters per gram. A sample of this material was then tested for ethylene polymerization activity as described earlier. It produced no polymer. This experiment is shown in Table II as example 10.

Examples 11–12

122 mls of the above ammonium sulfate solution was impregnated onto 40.6 grams of Ketjen grade B alumina. The wet mixture was dried in a vacuum oven at 110° C. for 12 hours. This is equivalent to 12.7 mmol of sulfate per gram of uncalcined alumina. The dried material was then ground through a 35 mesh screen and calcined in air at 400° C. according to the procedure described above. It was found to have a pore volume of only 0.25 cc/g and a surface area of only 38 square meters per gram. A sample of this material was then tested for ethylene polymerization activity as described earlier. Despite the very low porosity it still produced 33 g/g/h of polymer. This experiment is shown in Table II as example 11.

This same material was then calcined again in air at 750° C. as described earlier, and retested for polymerization activity. This time it provided 583 g/g/h of polymer. This is quite remarkable considering the very low surface area. The polymer was found to have a melt index of 0.15 and a high load melt index of 3.24. This experiment is shown in Table II as example 12.

Example 13A, B, C

Ketjen B alumina was first calcined in air at 600° C. as described earlier. Then 11.1 grams of this material was slurried with 30 mls of isopropanol mixed with 1.73 grams of sulfuric acid. This is equivalent to 1.6 mmol of sulfate per gram of calcined alumina. The isopropanol was then evaporated off under nitrogen with heat. The dry solid was then calcined in air at 550° C. as described earlier. A sample of this material was then tested for ethylene polymerization. It yielded 1387 g/g/h of polymer. This experiment is shown in Table II as example 13A.

The earlier procedure Ketjen B alumina was first calcined in air at 600° C., then 5.9 grams of this material was slurried with 15 mls of isopropanol mixed with 0.453 grams of sulfuric acid. This is equivalent to 1.6 mmol of sulfate per gram of calcined alumina. The isopropanol was then evaporated off under nitrogen with heat. The dry solid was then calcined in air at 550° C. as described earlier. It was found to have a pore volume of 0.93 cc/g and a surface area of 205 square meters per gram. A sample of this material was then tested for ethylene polymerization. It yielded 324 g/g/h of polymer. This experiment is shown in Table II as example 13B.

This material was then calcined again at 800° C. for three hours in air as described earlier. It was found to have a pore volume of 1.03 cc/g and a surface area of 236 square meters per gram. It provided activity of 58 g/g/h polymer. This experiment is shown in Table II as example 13C.

Examples 14A, B and 15

The procedure of example 11 was repeated except that 33.14 grams of Ketjen B alumina was impregnated with 11.60 grams of ammonium sulfate and then it was calcined at 550 C. The results of testing are shown in Table II as example 14A. During this run the sulfated alumina and metallocene were precontacted in the reactor for 32 minutes at 90 C. before other ingredients were introduced to begin the run. Polymer produced in this run was found to have a MI of 0.21, a HLMI of 3.5, giving a shear ratio of 16.7. Gel permeation chromatography of the polymer indicated Mw=168,000, Mn=67,900 and Mw/Mn=2.5. After calcining the sulfated alumina was found to have a surface area of 284 square meters per gram and a pore volume of 0.67 cc/g and an average pore radius of 94 angstroms.

The above sulfated alumina (14A) was then calcined in air at 650 C. for three hours and tested again for polymerization. Again the sulfated alumina and the metallocene were precontacted for 30 minutes at 90 C. Details of the run are shown in Table II as example 14B. This material was found to have a surface area of 305 square meters per gram, a pore volume of 0.9 cc/g, and an average pore volume of 110 angstroms.

Another sample of sulfated alumina was made by the same proceedure as example 14A except that 26.9 g of Ketjen B alumina was inpreganated with 5.41 g of ammonium sulfate. Calcination was at 550 C. It was found to have a surface area of 352 square meters per gram, a pore volume of 0.93 cc/g, and an average pore radius of 106 angstroms. Details of the polymertization are given in Table II as example 15.

Comparative Example 16

A solution of 2.0 grams of concentrated sulfuric acid in 200 mls of isopropanol was made. Ketjen B alumina was calcined in air at 600° C. as described earlier. Then 6.34 grams of this material was slurried with 16 mls of the solution. This is equivalent to 0.26 mmol of sulfate per gram of calcined alumina. The isopropanol was then evaporated off under nitrogen with heat. The dry solid was then calcined in air at 500° C. as described earlier. It was found to have a pore volume of 0.95 cc/g and a surface area of 213 square meters per gram. A sample of this material was then tested for ethylene polymerization. It yielded 6 g/g/h of polymer. This experiment is shown in Table II as example 16.

Example 17

A silica-alumina was obtained from W.R.Grace under the commercial name of MS13-110. It's properties and activity have already been described earlier. It was impregnated with sulfuric acid as described above in example 16 to contain 1.6 mmol sulfate per gram. It was then calcined in air at 600° C. as described earlier. A sample of this material was then charged to the reactor along with the metallocene and isobutane and stirred for 32 minutes at 90° C. before ethylene was added. It yielded 82 g/g/h of polymer. This experiment is shown in Table II as example 17.

Example 18

A solution of 0.5 grams of ammonium bifluoride in 30 mls of methanol was added to 4.5 grams of Ketjen grade B alumina which had been calcined in air at 600° C. as described earlier. This moistened the alumina just beyond the point of incipient wetness. This is equivalent to 3.90 mmol of fluoride per gram of calcined alumina. The methanol was then evaporated off under nitrogen with heat. The dry solid was then calcined in nitrogen at 500° C. as described earlier. A sample of this material was then tested for ethylene polymerization. It yielded 927 g/g/h of polymer. This experiment is shown in Table III as example 18.

Examples 19–21

The procedure described in example 18 was repeated except that the final calcination was accomplished at 250° C., 400° C., and 600° C. Each was tested for polymerization activity and the results are shown in Table III as examples 19, 20, and 21.

Example 22

The procedure described in example 18 was repeated except that uncalcined Ketjen B alumina was impregnated with 5.80 mmol per gram of fluoride. After calcination at 500° C. it was tested for polymerization activity and the result are shown in Table III as example 22.

Examples 23–24

W.R.Grace grade HPV alumina was calcined at 600° C. in air three hours, giving a material of surface area around 500 square meters per gram and pore volume of about 2.8 cc/g. 3.36 grams of this material was heated under fluidizing nitrogen to 600° C. Then 5.0 mls of perfluorohexane was injected into the nitrogen upstream from the alumina. Over the next 15 minutes the perfluorohexane evaporated at room temperature into the nitrogen and was then carried up through the fluidizing bed of alumina, where it reacted. This exposure would be equivalent to about 55 mmol of fluoride per gram of alumina if all of the fluoride reacted (which was obviously not the case). The alumina turned black, presumably due to carbon deposited on it. This material was then tested for polymerization activity when a sample was charged to the reactor with the metallocene at 90° C. After 30 minutes of stirring, triethyl aluminum and ethylene were added and the sample was found to provide 1266 g/g/h of polymer. Details are shown in Table III as example 23.

This material was then recalcined in air at 600° C. for three hours to burn off residual carbon. The black color turned back to white. It was then tested for polymerization activity when a sample of it was added to the reactor along with metallocene and triethyl aluminum, followed immediately by ethylene. It provided an activity of 2179 g/g/h of polymer. Details are shown in Table III as example 24.

Examples 25–26

Ketjen Grade B alumina was calcined in air for three hours at 600° C. as described in example 5. 9.29 grams of this alumina was charged to a dry quartz activator tube and fluidized in carbon monoxide at 600° C. Then 4.5 mls of methyl bromide was injected upstream into the carbon monoxide. During the next 30 minutes the methyl bromide was warmed with an electric heater causing it to evaporate and be carried by the carbon monoxide gas through the fluidizing alumina bed at 600° C. After this treatment the alumina was black, presumably from carbon deposits. A sample was tested for polymerization activity and found to give 223 g/g/h of polymer. In a second similar run it was found to give 181 g/g/h of polymer. These two runs are shown in Table IV as examples 25 and 26.

Example 27

Ketjen Grade B alumina was calcined in air for three hours at 600° C. as described in example 5. 9.82 grams of this alumina was charged to a dry quartz activator tube and fluidized in carbon monoxide at 600° C. Then 1.0 mls of bromine liquid was injected upstream into the carbon monoxide which slowly evaporated and was carried through the fluidizing alumina bed at 600° C. After this treatment the alumina was white. A sample was tested for polymerization activity and found to give 106 g/g/h of polymer. This run is shown in Table IV as example 27.

Examples 28–31

Ten mls of Ketjen Grade B alumina was calcined in air for three hours at 600° C. as described in example 5. After this calcining step, the furnace temperature was lowered to 400° C. and 1.0 ml of carbon tetrachloride was injected into the nitrogen stream and evaporated upstream from the alumina bed. It was carried into the bed and there reacted with the alumina to chloride the surface. This is equivalent to approximately 15.5 mmol chloride per gram of dehydrated alumina. After this treatment the alumina was white. A sample was tested for polymerization activity. In addition to the ethylene, 50 mls of 1-hexene was also added to the reactor as a comonomer. This material gave 939 g/g/h of copolymer having the following properties: melt index of 0.63, high load melt index of 10.6, shear ratio of 16.7, density of 0.9400, weight average MW of 126,000, number average MW of 50,200, and polydispersity of 2.5. This run in shown in Table V as example 28.

This chlorided alumina was run again but without the hexene and the details are shown in Table V as example 29. It produced 1019 g/g/h of polymer having the following properties: melt index of 0.15, high load melt index of 2.68, shear ratio of 17.9, density of 0.9493, weight average MW of 202,000, number average MW of 62,400, and polydispersity of 3.2.

In a similar experiment, 7.3 grams of Ketjen Grade B alumina already calcined at 600° C. in air, was treated with 0.37 mls of carbon tetrachloride vapor in nitrogen at 400° C. This is equivalent to approximately 2.4 mmol chloride per gram of calcined alumina. This material provided 146 g/g/h activity and is shown in Table V as example 30.

In yet another similar experiment, the procedure of example 29 was repeated except that 6.2 grams of 600° C.

calcined alumina was treated with 5.0 mls of carbon tetrachloride at 400° C., which is approximately equivalent to 37.6 mmol chloride per gram. This material yielded 1174 g/g/h activity and is shown in Table V as example 31.

Examples 32–35

Three other samples of Ketjen Grade B alumina were also calcined at 600° C. in air as described in the above examples and then treated with various amounts of carbon tetrachloride at various temperatures. Table V shows the results of these experiments as examples 32, 33, and 34. In example 33 the treatment was done in carbon monoxide gas instead of nitrogen.

The catalyst of example 33 was retested for polymerization activity but with the following variation. Instead of charging all ingredients to the reactor and immediately starting the run, the oxide and the metallocene were charged with the isobutane first and allowed to contact each other for 37 minutes at 90° C. before the cocatalyst and ethylene were added to begin the run. This run is shown in Table V as example 35.

Example 36

W.R.Grace Grade HPV alumina was calcined in air for three hours at 600° C., yielding a surface area of approximately 500 square meters per gram and a pore volume of about 2.8 cc/g. 5.94 grams of this alumina was then treated with 5.0 mls of carbon tetrachloride in nitrogen at 600° C. Results of polymerization testing are shown in Table V as example 36.

Example 37

W.R.Grace Grade MS13-110 silica-alumina was calcined in air for three hours at 600° C., as described in example 8 above. 11.2 grams then treated with 2.8 mls of carbon tetrachloride in nitrogen at 600° C. Results of polymerization testing are shown in Table V as example 37.

Example 38

6.96 grams of Ketjen Grade B alumina which had been calcined at 400° C. in air for three hours was charged to a dry activator tube and heated under nitrogen to 400° C. 2.1 mls of silicon tetrachloride was then injected into the nitrogen upstream from the alumina. As it evaporated it was carried up through the alumina bed, reacting and chloriding the surface. When tested for polymerization activity this material provided 579 g/g/h of polymer having a melt index of 0.20, a high load melt index of 3.58, and a shear ratio of 17.9. Details of the polymerization test are shown in Table VI as example 38.

Example 39

8.49 grams of Ketjen Grade B alumina which had been calcined at 600° C. in air for three hours was charged to a dry activator tube and heated under nitrogen to 300° C. 2.8 mls of thionyl chloride was then injected into the nitrogen upstream from the alumina. As it evaporated it was carried up through the alumina bed, reacting and chloriding the surface. When tested for polymerization activity this material provided 764 g/g/h of polymer having a melt index of 0.13, a high load melt index of 2.48, and a shear ratio of 18.6. Details of the polymerization test are shown in Table VI as example 39.

Example 40

7.63 grams of Ketjen Grade B alumina which had been calcined at 400° C. in air for three hours was charged to a dry activator tube and heated under dry air to 300° C. 2.55 mls of sulfuryl chloride was then injected into the air upstream from the alumina. As it evaporated over a period of about 45 minutes at room temperature it was carried up through the alumina bed, reacting and chloriding the surface. When tested for polymerization activity this material provided 459 g/g/h of polymer having a melt index of 0.11, a high load melt index of 2.83, and a shear ratio of 25.6. Details of the polymerization test are shown in Table VI as example 40.

Comparative Examples 41–43 and Examples 44–45

2.6955 grams of solid aluminum trichloride was added to the reactor along with 2.0 mls of 15% triethyl aluminum and 2.0 mls of the metallocene solution used in previous experiments. Isobutane and ethylene were added as in previous runs. However, no activity was observed. This run is summarized in Table 6 as example 41. The experiment was then repeated but with less aluminum trichloride in the reactor, but again no activity was observed. This was example 42. Thus AlCl3 itself does not function as an activator for metallocenes. There is a distinct difference between aluminum trichloride and chlorided alumina.

In the following example aluminum trichloride was deposited onto the surface of dehydrated alumina in order to give it a higher surface area. 1.4 grams of anhydrous aluminum trichloride was dissolved in 100 mls of dichloromethane. This solution was then added to 6 grams of Ketjen Grade B alumina which had been calcined at 600° C. in air for three hours. The dichloromethane was evaporated under nitrogen at 60° C. A sample of this material was then tested for polymerization activity (example 43) but it had little. The material was then heated under nitrogen to 250° C. for one hour and retested for polymerization activity (example 44). This time some activity was detected. Next the material was again heated under nitrogen to 400° C. for one hour and retested for polymerization activity (example 45) and activity was observed.

Comparative Examples 46 and 48 and Example 47

In another experiment 3.5 grams of Ketjen Grade B alumina calcined at 600° C. was treated with 10 mls of 25% ethyl aluminum dichloride (EADC) at 60° C. for 10 minutes, then rinsed twice to remove any unreacted EADC. When tested for polymerization activity (first without, then with cocatalyst), none was observed (example 46). The material was then heated under nitrogen for 1 hour at 200° C. and retested (example 47). Some activity was observed.

In a similar experiment 4.31 grams of Ketjen Grade B alumina calcined at 400° C. was treated with 30 mls of 25 wt % diethyl aluminum chloride (DEAC) at 90° C. for 30 minutes. The excess DEAC was decanted and the solid washed three times in dry heptane. It was then dried at 100° C. under nitrogen and tested for polymerization activity (example 48). It exhibited 29. g/g/h activity.

Comparative Example 49

A 2.26 gram sample of Davison 952 silica which had previously been calcined in dry air for three hours at 600° C. was impregnated to the point of incipient wetness with 3.4 mls of trifluoromethane sulfonic acid (95.7% pure). The procedure was done under nitrogen in a flask. This material was then mixed with 8.96 grams of Ketjen Grade B alumina which had previously been calcined in dry air for three hours at 600° C. The resulting solid material was 79.9% by weight alumina, 29.1% by weight silica. This procedure was done in a dry activator tube on a fluidized bed in nitrogen. The mixture was heated to 193° C.–230° C. for three hours in nitrogen to allow the trifluoromethane sulfonic acid to evaporate and react with the alumina, which would give a triflouromethane sulfonic acid loading of 1 millimole per gram of the alumina. It was then tested for polymerization activity as described above except that the ethylene pressure was set at 450 psig instead of 550 psig and 25 mls of 1-hexene was added to the reactor. Results are shown in Table VII.

Example 50

The solid oxide from example 49 was then heated under nitrogen to 400° C. for an additional three hours to further encourage distribution and reaction of the triflic acid. It was then tested for polymerization activity as described above except that the ethylene pressure was set at 450 psig instead of 550 psig and 25 mls of 1-hexene was added to the reactor. Results are shown in Table VII.

Example 51

The solid oxide from example 50 was again heated under nitrogen to 600° C. for an additional three hours to further encourage distribution of the triflic acid. It was then tested for polymerization activity as described above except that the ethylene pressure was set at 450 psig instead of 550 psig and 25 mls of 1-hexene was added to the reactor. Results are shown in Table VII.

Example 52

A solution of 0.5 grams of ammonium bifluoride was dissolved in 30 mls of methanol and deposited onto a 4.5 gram sample of Ketjen Grade B alumina which had been calcined at 600° C. for three hours in air. This brought the solid just beyond the point of incipient wetness. The methanol was then evaporated off under a nitrogen purge on a hot plate and then transferred to an activator tube, where it was heated under nitrogen to 500° C. and held 2 hours. 1.89 grams of this material was then treated at 500° C. under nitrogen with 0.5 mls of carbon tetrachloride injected into the gas stream. A sample was then tested for polymerization activity with metallocene and 2.0 mls of triethyl aluminum cocatalyst. It generated 3132 g/g/h of polymer. Details are listed in Table VIII.

Example 53–54

6.18 grams of W.R.Grace Grade HPV alumina which had been calcined at 600° C. for three hours in air yielding a surface area of approximately 500 square meters per gram and a pore volume of about 2.8 cc/g, was transferred to a dry activator tube and heated under nitrogen to 600° C. 0.24 mls of perfluorohexane was then injected into the nitrogen stream ahead of the furnace. The liquid evaporated and was carried up through the alumina bed, fluoriding its surface. Then 1.55 mls of carbon tetrachloride was injected into the nitrogen stream and carried into the alumina bed at 600° C. The temperature was cooled to 25° C. and the resultant fluorided-chlorided alumina was stored under nitrogen. A small sample of this material was then tested for polymerization activity with metallocene and triethyl aluminum. The activity, shown in example 53, was quite high, at 4390 g/g/h.

This material was then run again except that it was allowed to stir in isobutane with the metallocene at 90° C. for 30 minutes before the other ingredients were added. This procedure yielded 6298 g/g/h activity (example 54).

Example 55

Degussa Aluminoxid C, obtained by flame hydrolysis, was calcined at 600° C. in air for three hours. Then 2.74 grams of this calcined alumina was heated to 600° C. in air, into which 4.1 mls of perfluorohexane was injected. As the liquid evaporated, it was carried up by the air through the alumina bed. Afterwards the gas stream was switched from air to nitrogen and 1.0 ml of carbon tetrachloride was injected. After all had evaporated, the solid was cooled to room temperature and stored under dry nitrogen. A small sample was tested for polymerization activity with metallocene and cocatalyst as previously described. This material was found to yield 1383 g/g/h. Details are recorded in Table VIII.

Examples 56, 60–61, 63–64 and Comparative Examples 57–59, 62, 65–66

A chlorided alumina was prepared identically to that in example 33. In each experiment a sample of the oxide was added to the reactor under nitrogen, then 2 mls of a solution of 0.5 grams of bis(n-butyl cyclopentadienyl)zirconium dichloride in 100 mls of toluene was added, then 0.6 liter of isobutane liquid, then 1 mmol of the cocatalyst (usually from a hexane solution) followed by another 0.6 liter of isobutane, and finally the ethylene was added after the reactor reached 90° C. Table IX shows the results of these experiments as examples 56 through 62.

A similar comparison of cocatalysts was made using an alumina which had been fluorided rather than chlorided according to the preparation used in example 21. These runs are shown in Table IX in examples 63 through 66.

Examples 67–71

In each run below the fluorided chlorided alumina used in example 50 was charged to the reactor, followed by 2 mls of a solution of 0.5 grams of the selected metallocene in 100 mls of toluene, followed by 0.6 liter of isobutane liquid, then 2.0 mls of 1M triethyl aluminum as cocatalyst, followed by another 0.6 liters of isobutane and finally the ethylene. These runs were made at 90° C., like all previous runs. Details are shown in Table X.

TABLE I

| Ex. # | A[1] | ° C.[2] | S[3] | OAC[4] | P[5] | T[6] | A[7] |
|---|---|---|---|---|---|---|---|
| 1[8] | None | NA | 0.0000 | 2 | TEA | 0 | 61.1 | 0 |
| 2 | None | NA | 0.0000 | 2 | EADC | 0 | 28.0 | 0 |
| 3 | Silica | 600 | 0.5686 | 2 | TEA | 0.65 | 63.0 | 1 |
| 4 | Alumina | 800 | 0.6948 | 1 | TEA | 2.7 | 30.7 | 8 |
| 5 | Alumina | 600 | 0.2361 | 2 | TEA | 6.9 | 60.9 | 29 |
| 6 | Alumina | 400 | 0.8475 | 1 | TEA | trace | 57.2 | 0 |
| 7 | Alumino-Phosphate (0.8) | 600 | 0.8242 | 1 | TEA | 45 | 66.0 | 50 |

TABLE I-continued

| Ex. # | A[1] | ° C.[2] | S[3] | OAC[4] | P[5] | T[6] | A[7] |
|---|---|---|---|---|---|---|---|
| 8 | Silica-Alumina | 600 | 0.3912 | 1 | TEA | 8.3 | 40.0 | 32 |
| 9 | Silica-Titania | 600 | 0.1392 | 2 | TEA | 0 | 60.0 | 0 |

TABLE-I Notes
[1]This is the untreated solid oxide compound used.
[2]This is the calcining temperature.
[3]This is the amount of solid oxide compound, in grams, being contacted with the other compounds.
[4]This is the amount, in milliliters of organoaluminum compound used and the type of organoaluminum used. The TEA was a 15 weight percent solution of triethylaluminum in heptane.
[5]This is the amount of polymer produced in grams.
[6]This is the amount of time used in minutes.
[7]This is the activity in gP/(gS · hr).
[8]The amount of organometal compound used was 25 micromoles. The type of organometal compound used was bis(n-butylcyclopentadienyl) zirconium dichloride. This organometal compound was in a solution that contained 0.5 grams of bis(n-butylcyclopentadienyl) zirconium dichloride per 100 milliliters of toluene. Additionally, these example were run at 90° C., under 550 psig ethylene, in 1.2 liters of isobutane.

TABLE II

| Ex. # | A | S[2] | ° C.[3] | S[4] | OAC[5] | P[6] | T[7] | A[7] |
|---|---|---|---|---|---|---|---|---|
| 10[9] | Silica | 12.7 | 400 | 1.3360 | 2 | 0 | 30.0 | 0 |
| 11 | Alumina | 12.7 | 400 | 1.5251 | 2 | 38.0 | 45.0 | 33 |
| 12 | Alumina | 12.7 | 750 | 0.2994 | 2 | 174.5 | 60.0 | 583 |
| 13A | Alumina | 1.6 | 550 | 0.3474 | 1 | 385.5 | 48.0 | 1387 |
| 13B | Alumina | 0.8 | 550 | 0.7468 | 2 | 242.0 | 60.0 | 324 |
| 13C | Alumina | 0.8 | 800 | 0.8004 | 2 | 34.8 | 45.0 | 58 |
| 14A | Alumina | 2.7 | 550 | 0.0842 | 2 | 241 | 60 | 2862 |
| 14B | Alumina | 2.7 | 650 | 0.0801 | 2 | 203 | 60 | 2534 |
| 15 | Alumina | 1.5 | 550 | 0.0279 | 2 | 90 | 60 | 3226 |
| 16 | Alumina | 0.26 | 500 | 0.7749 | 2 | 2.3 | 30.0 | 6 |
| 17 | Silica-Alumina | 1.6 | 600 | 0.3318 | 1 | 19.0 | 42.0 | 82 |

Table-II Notes
[1]This is the solid oxide compound used.
[2]This is the amount of sulfate used in mmols sulfate per gram of solid oxide.
[3]This is the calcining temperature.
[4]This is the amount of solid oxide compound, in grams, being contacted with the other compounds.
[5]This is the amount, in milliliters, of TEA used. It was a 15 weight percent solution of triethylaluminum in heptane.
[6]This is the amount of polymer produced in grams.
[7]This is the amount of time used in minutes.
[8]This is the activity in gP/(gS · hr).
[9]The amount of organometal compound used was 25 micromoles. The type of organometal compound used was bis(n-butylcyclopentadienyl) zirconium dichloride. This organometal compound was in a solution that contained 0.5 grams of bis(n-butylcyclopentadienyl) zirconium dichloride per 100 milliliters of toluene. Additionally, these example were run at 90° C., under 550 psig ethylene, in 1.2 liters of isobutane.

TABLE III

| Ex. # | A[1] | S[2] | ° C.[3] | S[4] | OAC[5] | P[6] | T[7] | A[8] |
|---|---|---|---|---|---|---|---|---|
| 18[9] | Alumina | 3.90 | 500 | 0.8284 | 2 | 296.8 | 23.2 | 927 |
| 19 | Alumina | 3.90 | 250 | 0.2542 | 2 | 7.6 | 40.0 | 45 |
| 20 | Alumina | 3.90 | 400 | 0.2358 | 2 | 88.1 | 60.0 | 374 |
| 21 | Alumina | 3.90 | 600 | 0.2253 | 2 | 281.6 | 60.0 | 1250 |
| 22 | Alumina | 5.80 | 500 | 0.2563 | 1 | 243.9 | 60.0 | 952 |
| 23 | Alumina | 55 | 500 | 0.2212 | 1 | 280.0 | 60.0 | 1266 |
| 24 | Alumina | 55 | 600 | 0.0855 | 1 | 187.5 | 60.5 | 2179 |

Table-III Notes
[1]This is the solid oxide compound used.
[2]This is the amount of fluoride used in mmols fluoride per gram of solid oxide.
[3]This is the calcining temperature.
[4]This is the amount of solid oxide compound, in grams, being contacted with the other compounds.
[5]This is the amount, in milliliters, of TEA used. It was a 15 weight percent solution of triethylaluminum in heptane.
[6]This is the amount of polymer produced in grams.
[7]This is the amount of time used in minutes.
[8]This is the activity in gP/(gS · hr).
[9]The amount of organometal compound used was 25 micromoles. The type of organometal compound used was bis(n-butylcyclopentadienyl) zirconium dichloride. This organometal compound was in a solution that contained 0.5 grams of bis(n-butylcyclopentadienyl) zirconium dichloride per 100 milliliters of toluene. Additionally, these example were run at 90° C., under 550 psig ethylene, in 1.2 liters of isobutane.

TABLE IV

| Ex. # | A[1] | ° C.[2] | S[3] | OAC[4] | P[5] | T[6] | A[7] |
|---|---|---|---|---|---|---|---|
| 25[8] | Alumina | 600 | 0.2612 | 1 | 62.0 | 64.0 | 223 |
| 26 | Alumina | 600 | 0.1688 | 1 | 38.0 | 74.6 | 181 |
| 27 | Alumina | 600 | 0.2046 | 1 | 11.9 | 33.0 | 106 |

Table-IV Notes
[1]This is the solid oxide compound used.
[2]This is the calcining temperature.
[3]This is the amount of solid oxide compound, in grams, being contacted with the other compounds.
[4]This is the amount, in milliliters, of TEA used. It was a 15 weight percent solution of triethylaluminum in heptane.
[5]This is the amount of polymer produced in grams.
[6]This is the amount of time used in minutes.
[7]This is the activity in gP/(gS · hr).
[8]The amount of organometal compound used was 25 micromoles. The type of organometal compound used was bis(n-butylcyclopentadienyl) zirconium dichloride. This organometal compound was in a solution that contained 0.5 grams of bis(n-butylcyclopentadienyl) zirconium dichloride per 100 milliliters oftoluene. Additionally, these example were run at 90° C., under 550 psig ethylene, in 1.2 liters of isobutane.

TABLE V

| Ex. # | A[1] | S[2] | ° C.[3] | S[4] | OAC[5] | P[6] | T[7] | A[8] |
|---|---|---|---|---|---|---|---|---|
| 28[9] | Alumina | 15.5 | 400 | 0.1596 | 2 | 149.8 | 60.0 | 939 |
| 29 | Alumina | 15.5 | 400 | 0.1166 | 2 | 121.8 | 61.5 | 1019 |
| 30 | Alumina | 2.4 | 400 | 0.2157 | 2 | 28.8 | 55.0 | 146 |
| 31 | Alumina | 37.6 | 400 | 0.1021 | 2 | 123.9 | 62.0 | 1174 |
| 32 | Alumina | 11.7 | 250 | 0.4878 | 2 | 39.2 | 60.0 | 80 |
| 33 | Alumina | 11.7 | 600 | 0.2058 | 2 | 351.5 | 63.0 | 1627 |

TABLE V-continued

| Ex. # | A¹ | S² | °C.³ | S⁴ | OAC⁵ | P⁶ | T⁷ | A⁸ |
|---|---|---|---|---|---|---|---|---|
| 34 | Alumina | 38.2 | 800 | 0.0488 | 1 | 30.6 | 46.5 | 809 |
| 35 | Alumina | 11.7 | 600 | 0.1505 | 1 | 400.0 | 62.0 | 2572 |
| 36 | Alumina | 39.3 | 600 | 0.0927 | 1 | 260.2 | 60.0 | 2807 |
| 37 | Silica-Alumina | 11.7 | 600 | 0.0667 | 1 | 147.8 | 60.5 | 2198 |

Table-V Notes
¹This is the solid oxide compound used.
²This is the amount of chloride used in mmols chloride per gram of solid oxide.
³This is the calcining temperature.
⁴This is the amount of solid oxide compound, in grams, being contacted with the other compounds.
⁵This is the amount, in milliliters, of TEA used. It was a 15 weight percent solution of triethylaluminum in heptane.
⁶This is the amount of polymer produced in grams.
⁷This is the amount of time used in minutes.
⁸This is the activity in gP/(gS · hr).
⁹The amount of organometal compound used was 25 micromoles. The type of organometal compound used was bis(n-butylcyclopentadienyl) zirconium dichloride. This organometal compound was in a solution that contained 0.5 grams of bis(n-butylcyclopentadienyl) zirconium dichloride per 100 milliliters of toluene. Additionally, these example were run at 90° C., under 550 psig ethylene, in 1.2 liters of isobutane.

TABLE VI

| Ex. # | A¹ | Treatment | S² | OAC³ | P⁴ | T⁵ | A⁶ |
|---|---|---|---|---|---|---|---|
| 38⁷ | Alumina | SiCl4-400° C. | 0.2013 | 1 | 116.5 | 60.0 | 579 |
| 39 | Alumina | SOCl2-300° C. | 0.0793 | 1 | 62.0 | 61.4 | 764 |
| 40 | Alumina | SO2Cl2-300° C. | 0.3915 | 1 | 186.0 | 62.1 | 459 |
| 41 | none | AlCl3 solid | 2.6955 | 2 | 0 | 30.0 | 0 |
| 42 | none | AlCl3 solid | 0.0380 | 2 | 0 | 34.4 | 0 |
| 43 | Alumina | AlCl3-80° C. | 0.4264 | 2 | 4.3 | 28.0 | 22 |
| 44 | Alumina | AlCl3-250° C. | 0.3374 | 2 | 135.3 | 60.0 | 401 |
| 45 | Alumina | AlCl3-400° C. | 0.2335 | 1 | 74.9 | 60.0 | 322 |
| 46 | Alumina | EtAlCl2-60° C. | 0.8855 | 2 | 0 | 30.0 | 0 |
| 47 | Alumina | EtAlCl2-200° C. | 0.8943 | 2 | 122.9 | 49.0 | 168 |
| 48 | Alumina | Et2AlCl-90° C. | 0.4263 | 1 | 4.9 | 24.0 | 29 |

¹This is the solid oxide compound used.
²This is the amount of solid oxide compound, in grams, being contacted with the other compounds.
³This is the amount, in milliliters, of TEA used. It was a 15 weight percent solution of triethylaluminum in heptane.
⁴This is the amount of polymer produced in grams.
⁵This is the amount of time used in minutes.
⁶This is the activity in gP/(gS · hr).
⁷The amount of organometal compound used was 25 micromoles. The type of organometal compound used was bis(n-butylcyclopentadienyl) zirconium dichloride. This organometal compound was in a solution that contained 0.5 grams of bis(n-butylcyclopentadienyl) zirconium dichloride per 100 milliliters of toluene. Additionally, these example were run at 90° C., under 550 psig ethylene, in 1.2 liters of isobutane.

TABLE VII

| Ex. # | A¹ | S² | °C.³ | S⁴ | OAC⁵ | P⁶ | T⁷ | A⁸ |
|---|---|---|---|---|---|---|---|---|
| 49 | Alumina | 1.0 | 200 | .0868 | 1 | 1.5 | 80.5 | 13 |
| 50 | Alumina | 1.0 | 400 | .1530 | 1 | 95.1 | 60.5 | 616 |
| 51 | Alumina | 1.0 | 600 | .0467 | 1 | 51.1 | 60.2 | 1090 |

Table-VII Notes
¹This is the solid oxide compound used.
²This is the amount of triflate used in mmols triflate per gram of solid oxide.
³This is the calcining temperature.
⁴This is the amount of solid oxide compound, in grams, being contacted with the other compounds.
⁵This is the amount, in milliliters, of TEA used. It was a 15 weight percent solution of triethylaluminum in heptane.
⁶This is the amount of polymer produced in grams.
⁷This is the amount of time used in minutes.
⁸This is the activity in gP/(gS · hr).
⁹The amount of organometal compound used was 25 micromoles. The type of organometal compound used was bis(n-butylcyclopentadienyl) zirconium dichloride. This organometal compound was in a solution that contained 0.5 grams of bis(n-butylcyclopentadienyl) zirconium dichloride per 100 milliliters of toluene. Additionally, these example were run at 90° C., under 450 psig ethylene, in 1.2 liters of isobutane, and in 25 mls of 1-hexene.

TABLE VIII

| EX. # | A¹ | Treatment | S² | OAC³ | P⁴ | R⁵ | A⁶ |
|---|---|---|---|---|---|---|---|
| 52⁷ | Alumina | F/500C & Cl/500C | 0.2822 | 2 | 294.6 | 20.0 | 3132 |
| 53 | Alumina | F/600C & Cl/600C | 0.0767 | 2 | 338.4 | 60.3 | 4390 |
| 54 | Alumina | F/600C & Cl/600C | 0.0967 | 2 | 304.5 | 30.0 | 6298 |
| 55 | Alumina | F/600C & Cl/600C | 0.1196 | 1 | 174.2 | 63.2 | 1383 |

Table VIII Notes
¹This is the solid oxide compound used.
²This is the amount of solid oxide compound, in grams, being contacted with the other compounds.
³This is the amount, in milliliters, of TEA used. It was a 15 weight percent solution of triethylaluminum in heptane.
⁴This is the amount of polymer produced in grams.
⁵This is the amount of time used in minutes.
⁶This is the activity in gP/(gS · hr).
⁷The amount of organometal compound used was 25 micromoles. The type of organometal compound used was bis(n-butylcyclopentadienyl) zirconium dichloride. This organometal compound was in a solution that contained 0.5 grams of bis(n-butylcyclopentadienyl) zirconium dichloride per 100 milliliters of toluene. Additionally, these example were run at 90° C., under 550 psig ethylene, in 1.2 liters of isobutane.

TABLE X

| Ex. # | A¹ | Treatment | S² | Metallocene⁶ | P³ | T⁴ | A⁵ |
|---|---|---|---|---|---|---|---|
| 67 | Alumina | F/Cl 600C | 0.0212 | A | 141.3 | 63.3 | 6318 |
| 68 | Alumina | F/Cl 600C | 0.0170 | B | 31.1 | 66.3 | 1656 |

TABLE X-continued

| Ex. # | A[1] | Treatment | S[2] | Metallocene[6] | P[3] | T[4] | A[5] |
|---|---|---|---|---|---|---|---|
| 69 | Alumina | F/Cl 600C | 0.0213 | C | 15.8 | 64.2 | 693 |
| 70 | Alumina | F/Cl 600C | 0.1000 | D | 83.9 | 61.5 | 819 |

Table-IX Notes
[1]This is the solid oxide compound used.
[2]This is the amount of solid oxide compound, in grams, being contacted with the other compounds.
[3]This is the amount of polymer produced in grams.
[4]This is the amount of time used in minutes.
[5]This is the activity in gP/(gS · hr).
[6]A = bis(n-butylcyclopentadienyl) zirconium dichloride
B = bis(cyclopentadienyl) zirconium dichloride
C = bis(cyclopentadienyl) hafnium dichloride
D = bis(n-butylcyclopentadienyl) zirconium chloride trimethylsilysmethyl

TABLE IX

| Ex. # | A[1] | Treatment | S[2] | CC[3] | P[4] | T[5] | A[6] |
|---|---|---|---|---|---|---|---|
| 56[7] | Alumina | Chlorided | 0.1866 | AlEt3 | 336.0 | 60.0 | 1800 |
| 57 | Alumina | Chlorided | 0.1958 | GaMe3 | 0 | 60.0 | 0 |
| 58 | Alumina | Chlorided | 0.1878 | ZnEt2 | 0 | 60.0 | 0 |
| 59 | Alumina | Chlorided | 0.1756 | MgBu2 | 2.5 | 60.0 | 14 |
| 60 | Alumina | Chlorided | 0.1966 | AlEt2H | 52.6 | 60.0 | 268 |
| 61 | Alumina | Chlorided | 0.1777 | Al(I-Bu)3 | 293 | 60.0 | 1649 |
| 62 | Alumina | Chlorided | 0.1840 | LiHex | 0 | 60.0 | 0 |
| 63 | Alumina | Fluorided | 0.2253 | AlEt3 | 281.6 | 60.0 | 1250 |
| 64 | Alumina | Fluorided | 0.2181 | AlMe3 | 154.2 | 60.0 | 707 |
| 65 | Alumina | Fluorided | 0.2307 | AlEt2Cl | 0 | 40.0 | 0 |
| 66 | Alumina | Fluorided | 0.2465 | BEt3 | 0 | 30.0 | 0 |

Table-IX Notes
[1]This is the solid oxide compound used.
[2]This is the amount of solid oxide compound, in grams, being contacted with the other compounds.
[3]This is the amount, in milliliters, of cocatalyst used.
[4]This is the amount of polymer produced in grams.
[5]This is the amount of time used in minutes.
[6]This is the activity in gP/(gS · hr).
[7]The amount of organometal compound used was 25 micromoles. The type of organometal compound used was bis(n-butylcyclopentadienyl) zirconium dichloride. This organometal compound was in a solution that contained 0.5 grams of bis(n-butylcyclopentadienyl) zirconium dichloride per 100 milliliters of toluene. Additionally, these example were run at 90° C., under 550 psig ethylene, in 1.2 liters of isobutane.

That which is claimed is:

1. A process to produce a composition of matter, said process comprising contacting at least one organometal compound, at least one treated solid oxide compound, and at least one organoaluminum compound to produce said composition, wherein said organometal compound has the following general formula $$(X^1)(X^2)(X^3)(X^4)M^1$$

wherein $M^1$ is selected from the group consisting of titanium, zirconium, and hafnium, and wherein ($X^1$) is independently selected from the group consisting of cyclopentadienyls, indenyls, fluorenyls, substituted cyclopentadienyls, substituted indenyls, and substituted fluorenyls, and wherein said substituents on said substituted cyclopentadienyls, substituted indenyls, and substituted fluorenyls, are selected from the group consisting of aliphatic groups, cyclic groups, combinations of aliphatic and cyclic groups, and organometallic groups, and hydrogen; and wherein ($X^3$) and ($X^4$) are independently selected from the group consisting of halides, aliphatic groups, cyclic groups, combinations of aliphatic and cyclic groups, and organometallic groups, and wherein ($X^2$) is selected from the group consisting of Group OMC-I or Group OMC-II, wherein said organoaluminum compound has the following general formula, $$Al(X^5)_n(X^6)_{3-n}$$

wherein ($X^5$) is a hydrocarbyl having from 1–20 carbon atoms, and wherein ($X^6$) is a halide, hydride, or alkoxide, and wherein "n" is a number from 1 to 3 inclusive, wherein said treated solid oxide compound is produced by a process comprising contacting at least one solid oxide compound with an electron-withdrawing anion source compound; and wherein said at least one solid oxide compound is calcined before, during or after contacting said electron-withdrawing anion source;

wherein the activity of said composition is greater than 250 grams of polyethylene per gram of treated solid oxide compound per hour; and wherein there is a substantial absence of aluminoxanes and organoborates.

2. A process to produce a composition of matter, said process comprising contacting at least one organometal compound, at least one treated solid oxide compound, and at least one organoaluminum compound to produce said composition, wherein said composition can polymerize ethylene into a polymer with an activity greater than 250 (gP/(gS·hr)), and wherein said organometal compound has the following general formula $$(X^1)(X^2)(X^3)(X^4)M^1$$

wherein $M^1$ is selected from the group consisting of titanium, zirconium, and hafnium, and wherein ($X^1$) is independently selected from the group consisting of cyclopentadienyls, indenyls, fluorenyls, substituted cyclopentadienyls, substituted indenyls, and substituted fluorenyls, and wherein said substituents on said substituted cyclopentadienyls, substituted indenyls, and substituted fluorenyls, are selected from the group consisting of aliphatic groups, cyclic groups, combinations of aliphatic and cyclic groups, and organometallic groups, and hydrogen; and wherein ($X^3$) and ($X^4$) are independently selected from the group consisting of halides, aliphatic groups, cyclic groups, combinations of aliphatic and cyclic groups, and organometallic groups, and wherein ($X^2$) is selected from the group consisting of Group OMC-I or Group OMC-II, wherein said organoaluminum compound has the following general formula, $$Al(X^5)_n(X^6)_{3-n}$$

wherein ($X^5$) is a hydrocarbyl having from 1–20 carbon atoms, and wherein ($X^6$) is a halide, hydride, or alkoxide, and wherein "n" is a number from 1 to 3 inclusive, and wherein said treated solid oxide compounds comprise oxygen and at least one element selected from the group consisting of groups 2, 3, 4, 5, 6, 7, 8, 9, 10, 11, 12, 13, 14, and 15 of the periodic table, including lanthanides and actinides, wherein said treated solid oxide compound is produced by a process comprising contacting at least one solid oxide compound with an electron-withdrawing anion source compound; and wherein said at least one solid oxide compound is calcined before, during or after contacting said electron-withdrawing anion source; and wherein there is a substantial absence of aluminoxanes and organoborates in said composition.

3. A process according to claim 2 wherein said activity is greater than 250.

4. A process according to claim 3 wherein said activity is greater than 500.

5. A process according to claim 4 wherein said activity is greater than 1000.

6. A process according to claim 5 wherein said activity is greater than 2000.

7. A composition produced by the process of claim 2.

8. A process according to claim 2 wherein said composition can polymerize ethylene into a polymer with an activity greater than 2000 (gP/(gS·hr)), and wherein said organometal compound is selected from the group consisting of
bis(cyclopentadienyl)hafnium dichloride;
bis(cyclopentadienyl)zirconium dichloride;
(ethyl(indenyl)$_2$)hafnium dichloride;
(ethyl(indenyl)$_2$)zirconium dichloride;
(ethyl(tetrahydroindenyl)$_2$)hafnium dichloride;
(ethyl(tetrahydroindenyl)$_2$)zirconium dichloride;
bis(n-butylcyclopentadienyl)hafnium dichloride;
bis(n-butylcyclopentadienyl)zirconium dichloride;
((dimethyl)(diindenyl)silane)zirconium dichloride;
((dimethyl)(diindenyl)silane)hafnium dichloride;
((dimethyl)(ditetrahydroindenyl)silane)zirconium dichloride;
((dimethyl)(di(2-methyl indenyl))silane)zirconium dichloride;
bis(fluorenyl)zirconium dichloride, and
wherein said organoaluminum compound is selected from the group consisting of
trimethylaluminum;
triethylaluminum;
tripropylaluminum;
diethylaluminum ethoxide;
tributylaluminum;
triisobutylaluminum hydride;
triisobutylaluminum;
diethylaluminum chloride, and wherein said solid oxide compound is selected from the group consisting of $Al_2O_3$, $B_2O_3$, BcO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$; and mixtures thereof, and wherein said treated solid oxide compound has been contacted with fluoride or chloride or both.

9. A process according to claim 1 consisting essentially of contacting said organometal compound, said treated solid oxide compound, and said organoaluminum compound to produce said composition.

10. A process according to claim 2 consisting essentially of contacting said organometal compound, said treated solid oxide compound, and said organoaluminum compound to produce said composition.

11. A process according to claim 2 wherein said treated solid oxide compound is produced by a process comprising:

1) contacting a solid oxide compound with at least one electron-withdrawing anion source compound to form a first mixture; and 2) calcining said first mixture to form said treated solid oxide compound.

12. A process according to claim 11 wherein said electron-withdrawing anion source compound is selected from the group consisting of sulfates, halides, and triflate.

13. A process according to claim 12 wherein said calcining is conducted for about 1 hour to about 10 hours at a temperature in the range of about 400 to about 800° C.

14. A process according to claim 1 wherein said treated solid oxide compound is produced by a process comprising:

1) contacting at least one solid oxide compound with a first electron-withdrawing anion source compound to form a first mixture;

2) calcining said first mixture to produce a calcined first mixture;

3) contacting said calcined first mixture with a second electron-withdrawing anion source compound to form a second mixture; and 4) calcining said second mixture to form said treated solid oxide compound.

15. A process according to claim 2 wherein said composition is produced by a process comprising:

1) contacting said organometal compound and said treated solid oxide compound together for about 1 minute to about 1 hour at a temperature of about 25 to about 100° C. to form a first mixture, 2) contacting said first mixture with an organoaluminum compound to form the composition.

16. A process to produce a composition, said process comprising:

1) calcining alumina for 3 hours at 600° C. to produce a calcined alumina;

2) contacting said calcined alumina with carbon tetrachloride to produce a chlorided alumina;

3) combining said chlorided alumina with bis(n-buytlcyclopentadienyl)zirconium dichloride for 1 minute to 1 hour at a temperature in a range of about 25 to about 100° C. to produce a mixture; and 4) combining said mixture and triethylaluminum to produce said composition.

17. A composition produced by the process of claim 1.

18. A composition produced by the process of claim 9.

19. A composition produced by the process of claim 10.
20. A composition produced by the process of claim 16.
21. A composition according to claim 7 wherein said composition subsequent to contacting the organometal compound, treated solid oxide compound, and organoaluminum compound consists essentially of organometal compound and treated solid oxide compound.
22. A composition according to claim 21 wherein said composition subsequent to contacting the organometal compound, treated solid oxide compound, and organoaluminum compound consists essentially of organometal compound, treated solid oxide compound, and organoaluminum compound.
23. A process comprising:
1) contacting an oxide selected from alumina, silica-alumina, aluminophosphate, and mixtures thereof with at least one treating agent selected from sulfating agents, fluoriding agents, and chloriding agents to produce a treated oxide;
2) calcining said treated oxide to produce a calcined treated oxide; and
3) combining (1) said treated oxide, (2) an organoaluminum compound selected from triethylaluminum, triisobutylaluminum, and mixtures thereof; and (3) an organometal compound.
24. A process according to claim 23 wherein said organometal compound is bis(n-butylcyclopentadienyl) zirconium dichloride.
25. A process according to claim 23 wherein said treating agent is a fluoriding agent and a chloriding agent.
26. A process according to claim 25 wherein said fluoriding agent and chloriding agent are contacted sequentially with said oxide.
27. A process according to claim 26 wherein said fluoriding agent is perfluorohexane and said chloriding agent is carbon tetrachloride.
28. A process according to claim 23 wherein said oxide is calcined before said contacting and calcined after said contacting.
29. A process according to claim 23 wherein said oxide is calcined during said contacting.
30. A process according to claim 23 wherein said contacting is carried out by impregnation and the resulting impregnated oxide is dried before said calcining.
31. A process according to claim 23 wherein said treating agent is ammonium sulfate.
32. A process according to claim 23 wherein said treating agent is trifluoromethane and sulfonic acid.
33. A process according to claim 23 wherein said treating agent is selected from sulfuric acid and ammonium sulfate.
34. A process according to claim 23 wherein said treating agent is ammonium bifluoride.
35. A process according to claim 23 wherein said treating agent is selected from thionyl chloride and sulfuryl chloride.
36. A catalyst composition produced by the process of claim 23.
37. A catalyst composition produced by the process of claim 25.
38. A process to produce a composition of matter, said process consisting essentially of contacting at least one organometal compound, at least one treated solid oxide compound, and at least one organoaluminum compound to produce said composition,
wherein said organometal compound has the following general formula $(X^1)(X^2)(X^3)(X^4)M^1$ wherein $M^1$ is selected from the group consisting of titanium, zirconium, and hafnium, and
wherein $(X^1)$ is independently selected from the group consisting of cyclopentadienyls, indenyls, fluorenyls, substituted cyclopentadienyls, substituted indenyls, and substituted fluorenyls, and
wherein said substituents on said substituted cyclopentadienyls, substituted indenyls, and substituted fluorenyls, are selected from the group consisting of aliphatic groups, cyclic groups, combinations of aliphatic and cyclic groups, and organometallic groups, and hydrogen; and
wherein $(X^3)$ and $(X^4)$ are independently selected from the group consisting of halides, aliphatic groups, cyclic groups, combinations of aliphatic and cyclic groups, and organometallic groups, and
wherein $(X^2)$ is selected from the group consisting of Group OMC-I or Group OMC-II,
wherein said organoaluminum compound has the following general formula, $Al(X^5)_n(X^6)_{3-n}$ wherein $(X^5)$ is a hydrocarbyl having from 1–20 carbon atoms, and
wherein $(X^6)$ is a halide, hydride, or alkoxide, and
wherein "n" is a number from 1 to 3 inclusive,
wherein said treated solid oxide compound is produced by a process comprising contacting at least one solid oxide compound with an electron-withdrawing anion source compound; and
wherein said at least one solid oxide compound is calcined before, during or after contacting said electron-withdrawing anion source;
wherein the activity of said composition is greater than 250 grams of polyethylene per gram of treated solid oxide compound per hour;
wherein there is a substantial absence of aluminoxanes and organoborates.
39. A process to produce a composition of matter, said process consisting essentially of contacting at least one organometal compound, at least one treated solid oxide compound, and at least one organoaluminum compound to produce said composition,
wherein said composition can polymerize ethylene into a polymer with an activity greater than 250 (gP/(gS·hr)), and
wherein said organometal compound has the following general formula $(X^1)(X^2)(X^3)(X^4)M^1$ wherein $M^1$ is selected from the group consisting of titanium, zirconium, and hafnium, and
wherein $(X^1)$ is independently selected from the group consisting of cyclopentadienyls, indenyls, fluorenyls, substituted cyclopentadienyls, substituted indenyls, and substituted fluorenyls, and
wherein said substituents on said substituted cyclopentadienyls, substituted indenyls, and substituted fluorenyls, are selected from the group consisting of aliphatic groups, cyclic groups, combinations of aliphatic and cyclic groups, and organometallic groups, and hydrogen; and
wherein $(X^3)$ and $(X^4)$ are independently selected from the group consisting of halides, aliphatic groups, cyclic groups, combinations of aliphatic and cyclic groups, and organometallic groups, and wherein ($X^2$) is selected from the group consisting of Group OMC-I or Group OMC-II, wherein said organoaluminum compound has the following general formula, $$Al(X^5)_n(X^6)_{3-n}$$

wherein ($X^5$) is a hydrocarbyl having from 1–20 carbon atoms, and wherein ($X^6$) is a halide, hydride, or alkoxide, and wherein "n" is a number from 1 to 3 inclusive, and wherein said treated solid oxide compounds comprise oxygen and at least one element selected from the group consisting of groups 2, 3, 4, 5, 6, 7, 8, 9, 10, 11, 12, 13, 14, and 15 of the periodic table, including lanthanides and actinides, wherein said treated solid oxide compound is produced by a process comprising contacting at least one solid oxide compound with an electron-withdrawing anion source compound; and wherein said at least one solid oxide compound is calcined before, during or after contacting said electron-withdrawing anion source; and wherein there is a substantial absence of aluminoxanes and organoborates in said composition.

* * * * *